Dec. 26, 1933.                A. HELLER                1,941,088
                              EGG OPENER
                         Filed July 16, 1932          2 Sheets-Sheet 1
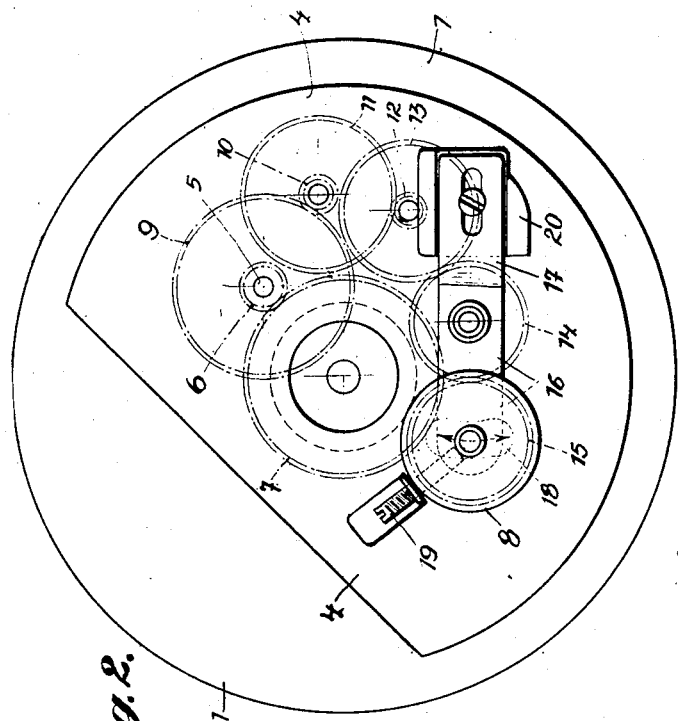
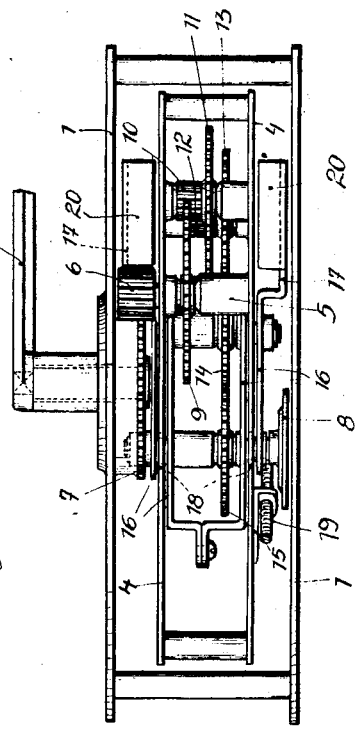
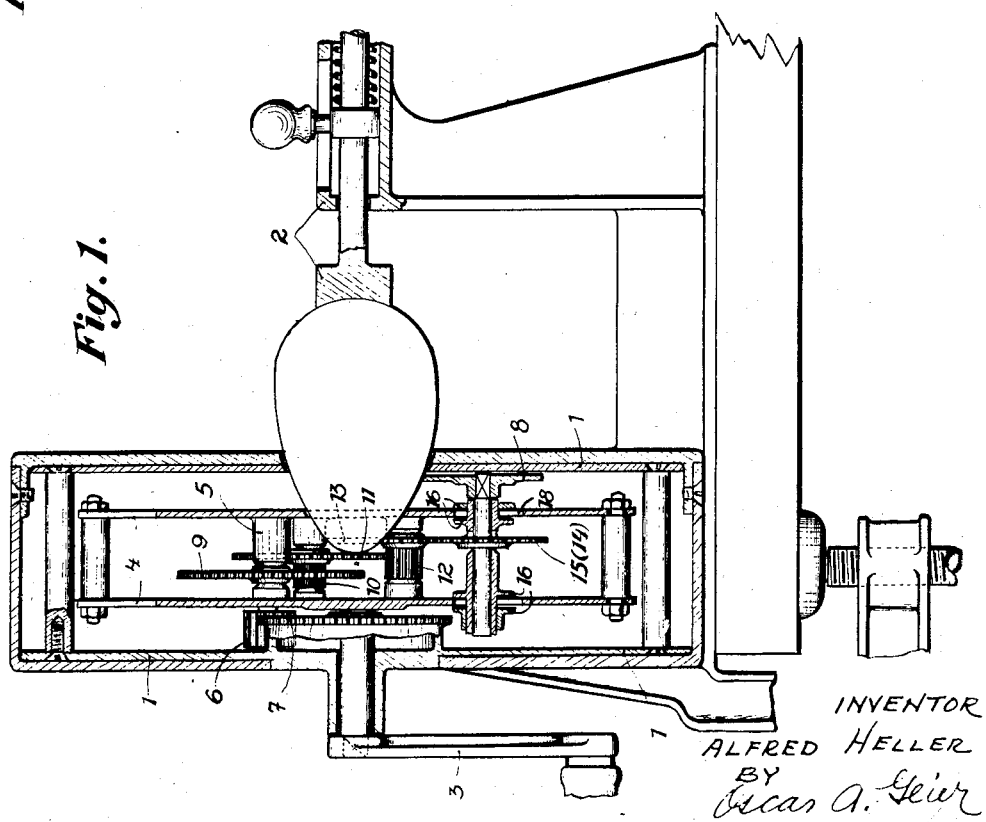
INVENTOR
ALFRED HELLER
BY
ATTORNEY Dec. 26, 1933.   A. HELLER   1,941,088
EGG OPENER
Filed July 16, 1932   2 Sheets-Sheet 2
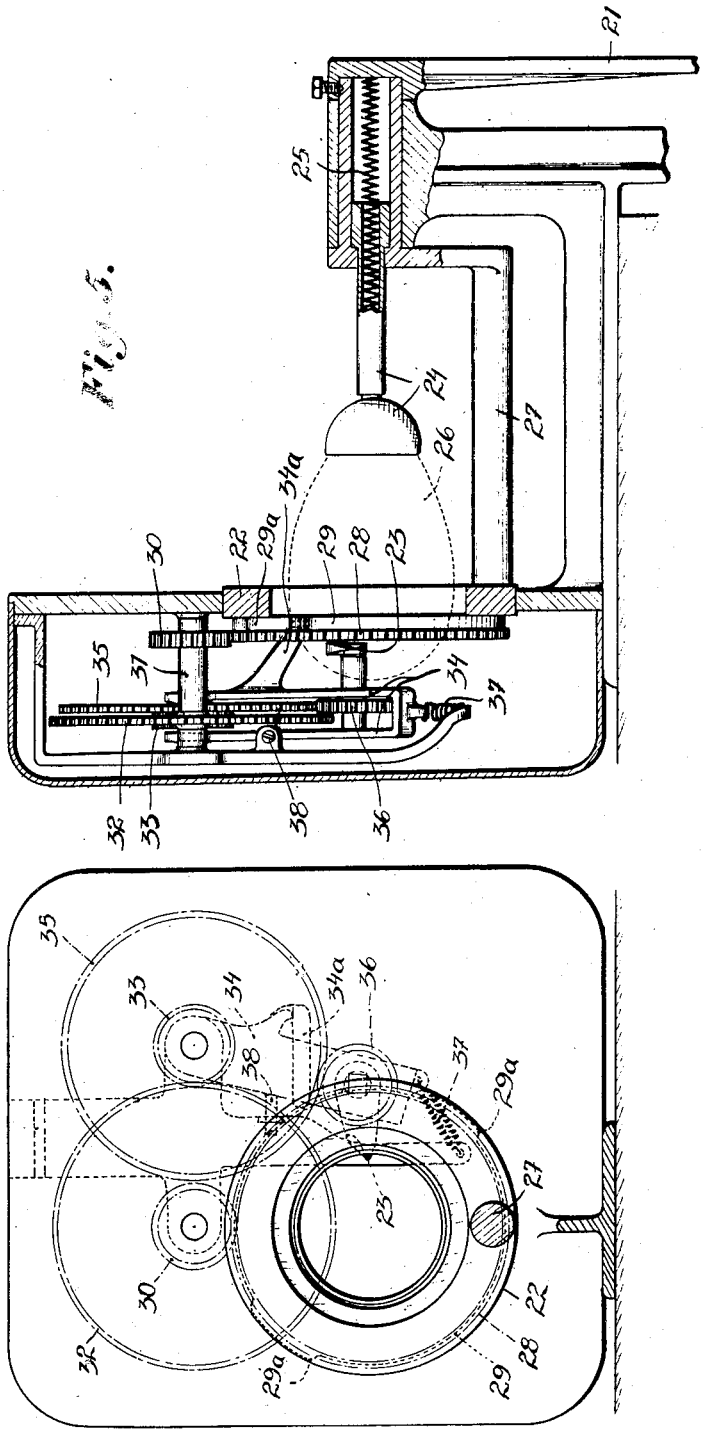
INVENTOR
ALFRED HELLER
BY
Oscar A. Geiz
ATTORNEY Patented Dec. 26, 1933

1,941,088

UNITED STATES PATENT OFFICE 1,941,088

EGG OPENER

Alfred Heller, Bad Liebenstein, Germany

Application July 16, 1932, Serial No. 622,862, and in Germany July 6, 1931

2 Claims. (Cl. 146—2)

This invention relates to an egg opener and is characterized in that for cutting open the egg shell a rapidly rotating tool, for example a circular scoring knife is employed, the speed of rotation of which is greater than its speed of movement around the egg. According to the invention the rotating scoring tool can be further pressed against the egg shell automatically or against the action of a spring by hand.

Egg openers with hand crank, toothed wheel gearing and a scoring tool rotating around the egg are known. In these openers however the tool consists of a cutting iron or the like which is pressed gradually against the egg by an adjusting screw. It has been found that such tools which do not rotate at a high speed around their own axis are not capable of cutting a relatively hard egg shell without breaking same. Only by employing tools according to the invention which rotate at a high speed around their own axis and consequently continually knock off small pieces of the egg shell can a satisfactory result be produced.

The known egg openers fail to fulfill their purpose for two reasons. The cross section of an egg is not mathematically circular but shows deviations which are often greater than the thickness of the shell. If therefore a rigid knife or a knife which is gradually shiftable only by an adjusting screw is employed this knife if rotated around the egg cup will be situated at one point at a distance from the egg shell and at another point will have already cut through the shell and penetrated into the interior of the egg. A smooth cutting off of the egg shell without damaging the interior of the egg shell and therefore perfect from a hygienic point of view is consequently not possible with the known arrangement.

This objection is overcome according to the invention in that the scoring tool rotating at a high speed can be continually pressed against the egg shell automatically or against the action of a spring by hand during the rotation of the egg cup so that the deviations in the circular shape of the egg are immaterial.

Further the rotary scoring tool, for example the rotary scoring disc, can be mounted in a novel manner on a rocking beam which is equilibrated at its free end by a counter weight and pressed against the egg for example by the tooth pressure.

Two embodiments of the invention are illustrated by way of example in the accompanying drawings in which:

Fig. 1 shows the egg opener in longitudinal section in operative position.

Fig. 2 is a front elevation with the casing removed.

Fig. 3 is a top plan view of Fig. 2.

Figs. 4 and 5 show a modified form of construction of the opener.

In the form of construction illustrated in Figs. 1 to 3 the casing 1 can be fixed by screws on to the table. The casing carries a spring influenced holding device 2 for the outer end of the egg. In the casing 1 a crank 3 is rotatably mounted and rigidly connected to a frame 4. The frame 4 carries a shaft 5 with pinion 6 meshing like a planet wheel in a toothed wheel 7 connected to the casing 1. Thus during the rotation of the crank 3 on the one hand the frame 4 and on the other hand the shaft 5 will rotate relative to the rotating frame 4. The movement of the shaft 5 is transmitted by toothed wheels to a scoring disc 8 serving for cutting open the egg. For this purpose a toothed wheel 9 is keyed on the shaft 5 and meshes with a pinion 10 (Fig. 2). A toothed wheel 11 meshing with a pinion 12 is keyed on the shaft of the pinion 10. From a toothed wheel 13 on the same shaft a toothed wheel 14 is driven which in turn drives a toothed wheel 15 on the axis of which the scoring disc 8 is keyed. By means of this transmission the slow rotation of the crank 3 is converted into a rapid rotation of the scoring disc 8. This disc therefore rotates at a high speed around its own axis and at the same time slowly with the frame 4 around the egg.

The scoring disc 8 is according to the invention carried by a rocker beam 16 oscillatable on the axle of the wheel 14. The axle journaled in the rocker beam 16 and carrying the scoring disc 8 and the toothed wheel 15 extends through an elongated aperture 18 in the frame 4. The wheel 14 presses the tool against the shell of the egg owing to the tooth pressure occurring between this wheel and the wheel 15. This movement of the rocker beam is limited by an adjustable stop 19 in such a manner that only the egg shell is removed and the skin between this shell and the interior of the egg remains undamaged.

In the form of construction illustrated in Figs. 4 and 5 a ring 22 carrying the egg is rotated on the one band at a low speed by means of a crank 21, whereas this crank rotates on the other hand a striking tool 23. For this purpose an egg holder 24 is fixed on the crank shaft 21 and is acted upon by a spring 25 which, as shown in Fig. 5, presses the holder against the egg 26. The arm 27 is connected to the crank shaft and consequently drives the ring 22, a toothed wheel 28 and a cam disc 29 which are rigidly interconnected. The toothed wheel 28 meshes with a pinion 30 keyed on a shaft 31 which carries a large toothed wheel 32. This toothed wheel 32 meshes with a pinion 33 keyed on the same axle as a rocking beam 34 which carries on its free end the striking tool 23 for scoring the egg shell. The rotary movement of the wheel 33 is transmitted to a large toothed wheel 35 keyed on the same axle as the pinion 33. This toothed wheel 35 meshes with a small toothed wheel 36 on the end of the rocker beam, which wheel 36 consequently causes the striker tool 23 to rotate in the plane of Fig. 4. The rocker beam 34 is pressed by a spring 37 against an adjusting screw 38 which regulates the depth of the incision in the egg shell.

The striker tool however not only performs a rotary movement but also an intermittent radial movement towards the egg shell. For this purpose the upper cam disc 29 is provided, the cams 29a of which engage behind an arm 34a of the rocker beam 34 and force the rocker arm intermittently in outward radial direction against the action of a spring 37, the rocker arm and the rotary striker tool being pressed against the egg by this spring 37. Owing to this movement of the striker tool rotating around its own axis and intermittently striking in radial direction, the egg shell is broken in very small pieces in the shape of a circular line.

I claim:

1. An egg opener, comprising a support for an egg, a rotary tool adapted to cut the shell of the egg, a frame connected with said support, a crank rotatably mounted in said frame, another frame connected with said crank and rotatable therewith, a toothed wheel rigidly connected with the first-mentioned frame, another toothed wheel meshing with the first-mentioned wheel and rotatably mounted in the second-mentioned frame, a gear mechanism carried by the second-mentioned frame and transmitting the rotation of the second-mentioned toothed wheel to said tool, and a rocker beam oscillatably mounted in the second-mentioned frame and carrying said tool.

2. An egg opener, comprising a support for an egg, a rigid frame connected with said support, another rotatable frame, means connected with the first-mentioned frame for rotating the second-mentioned frame, a rocker beam oscillatably mounted in the second-mentioned frame, a tool rotatably mounted in said rocker beam, a toothed wheel pivoted in said rocker beam and rotatable along with said tool, another toothed wheel pivoted in said rocker beam and meshing with the first-mentioned wheel, the second-mentioned wheel pressing said tool against the shell of the egg, and a plurality of toothed wheels carried by the second-mentioned frame and transmitting the motion of said means to the second-mentioned wheel.

ALFRED HELLER.